April 17, 1945.  B. A. PARR  2,373,776
REMOTE CONTROL
Filed Sept. 15, 1943
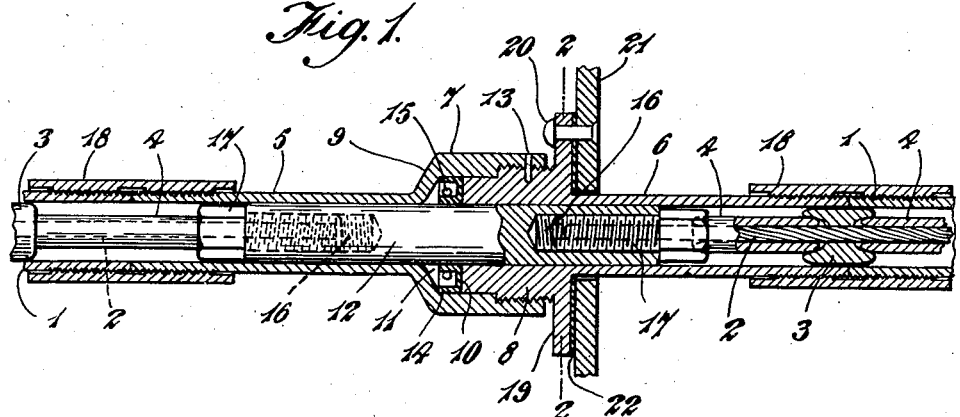
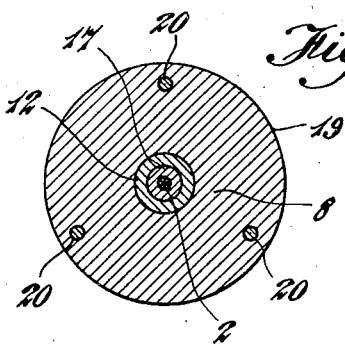
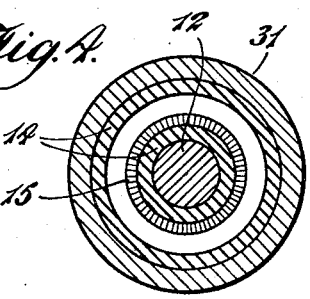
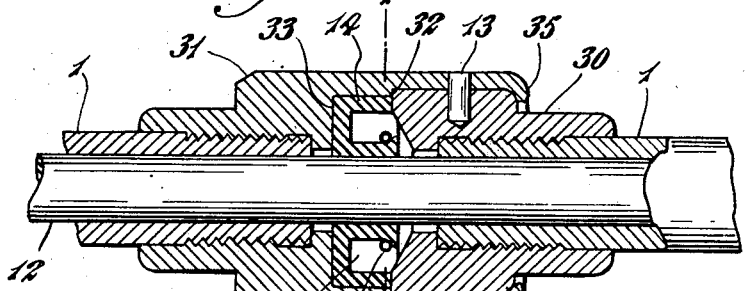
Inventor
Bernard A. Parr
By
Watson, Cole, Grindle & Watson
Attorneys Patented Apr. 17, 1945

2,373,776

UNITED STATES PATENT OFFICE 2,373,776

REMOTE CONTROL

Bernard Arthur Parr, London, England, assignor to Simmonds Aerocessories Limited, London, England Application September 15, 1943, Serial No. 502,540
In Great Britain October 22, 1942

1 Claim. (Cl. 74—501)

This invention relates to remote controls comprising a tubular casing having therein a cable, rod, tube or other member for transmitting motion, and more particularly but not exclusively to compound motion-transmitting devices of the kind comprising a tubular casing having therein a cable or other means for transmitting tension loads and separate means for transmitting compression loads, and the present invention has for its object to provide a remote control enabling motion to be transmitted through a partition, bulkhead or the like separating relatively high and low pressure zones without leakage of fluid through the tubular casing from the zone of high pressure to the zone of low pressure.

In accordance with the present invention fluid is prevented from passing through the tubular casing by means comprising an imperforate motion-transmitting rod movably housed within sections of the tubular casing and serving as a link in the motion-transmitting means, means securing together the adjacent ends of the casing sections and providing a chamber surrounding the said rod, and sealing means housed within the said chamber and engaging the said rod.

The sections of the tubular casing may be integral with the securing means for the sections and in one of its aspects the invention comprises a unit for insertion in the transmission system, for example, at the point thereof where the high pressure zone is separated from the low pressure zone, said unit comprising two axially aligned tubes formed at their inner ends with interengaging means which secure the tubes together and provide therebetween an annular chamber, an imperforate motion-transmitting rod movably housed within the tubes, and sealing means housed within said annular chamber and engaging said rod to prevent leakage of fluid through the tubes. The said rod is a close fit within the axially aligned tubes and is adapted to serve as a link in the motion-transmitting means whereby the desired movement may be transmitted from one end of the system to the other.

The present invention is more especially intended for use with a flexible motion-transmitting device as described in the specification of Letters Patent No. 1,939,766 granted to L. A. M. Corset and comprising a tubular casing having housed therein a flexible cable for transmitting tension loads and a series of barrels ("olives") and tubular elements ("tubelets") loosely threaded on the cable for transmitting compression loads, the "tubelets" being engaged at their ends in truncated conical recesses in the "olives" so as to permit relative angular movement between the "olives" and "tubelets" and such a compound motion-transmitting device is shown in the accompanying drawing in which like reference numerals denote like parts and in which Fig. 1 is a central longitudinal sectional view illustrating one form of the invention;

Fig. 2 is a sectional view taken on the line 2—2 of Fig. 1;

Fig. 3 is a central longitudinal sectional view illustrating another form of the invention, and Fig. 4 is a sectional view taken on the line 4—4 of Fig. 3.

The remote control system shown in Figs. 1 and 2 comprises a tubular casing 1 in which moves a compound motion transmitting means comprising a cable 2 for transmitting tension loads, and a series of alternately arranged "olives" 3 and "tubelets" 4 threaded on the cable, for transmitting compression loads. In this system there is inserted a unit comprising two axially aligned tubes 5, 6 which for the greater part of their length are of the same dimensions as the tubular casing 1. The inner end of tube 5 is enlarged to form a cylindrical socket section 7 which is internally threaded and connected to the main section of the tube by a conical portion 9. The external diameter of tube 6 at the inner end thereof is greater than that of the main section of the tube and the inner end is externally threaded to form a spigot section 8 that is screwed into the socket 7 of the tube 5 with the end face 10 of the spigot, which face extends normal to the axis of the tube, spaced from the conical portion 9 of tube 5, whereby an annular chamber 11 is formed which surrounds a solid cylindrical rod 12 which is housed and extends within the tubes 5, 6. The inside of the socket 7 and the outside of the spigot 8 are preferably stepped, as shown in the drawing, to form co-operating annular shoulders limiting the extent to which the spigot 8 is screwed into the socket 7, whilst means, such as the pin 13, are advantageously provided to key the spigot and socket together against relative rotary movement.

Housed within the annular chamber 11 is sealing means which may take any suitable form. A preferred form of sealing means is shown in the drawing, according to which the sealing means comprises an annular sealing member 14 of rubber or other elastic material and of channel section, the sealing member 14 being housed within the chamber 11 with its base seated against the end face 10 of the spigot 8 and the inner and outer sides of the sealing member seated against the rod 12 and the inside of the socket 7 respectively. An annular spring 15 housed within the channel formed by the sealing member 14 presses it firmly against the sliding rod 12.

Each end of the sliding rod 12 has an axially extending internally threaded socket 16 into which are screwed externally threaded terminal members 17 of the motion-transmitting device. The terminal members 17 are secured to the ends of the flexible cable 2, e. g. are sweated or swaged on to the cable, whilst the outer ends of the terminal members are recessed to form a seat for "tubelets" of the means for transmitting compression loads. The outer ends of the tubes 5, 6 are joined to the adjacent ends of the tubular casing 1 in any suitable manner. For example, as shown in the drawing, the adjacent ends of the tubular casing and tubes may be externally threaded and secured together in axial alignment by an internally threaded sleeve 18.

The unit may be inserted at any desired part of the control system and may, if desired be provided with any suitable means whereby it may be secured to a support, e. g. a wall of the pressure cabin of an aircraft. To this end the spigot section 8 of the tube 6 is advantageously formed with an integral flange 19 formed with apertures to receive rivets or other fastenings 20, whereby the flange may be secured to a support 21, packing 22 being preferably interposed between the flange 19 and support 21.

The length of the sliding rod 12 is greater than the maximum distance through which the motion-transmitting device can be moved so that the sealing member 14 is at all positions of the transmitting device maintained in contact with the sliding rod.

The unit above described is preferably so installed that the channel in the annular sealing member 14 is open to the high pressure zone. In this manner the high pressure fluid aids the spring. in holding the sealing member firmly against its seating surfaces and a highly satisfactory seal is obtained.

In the form of the invention illustrated in Figs. 3 and 4, co-operating spigot and socket members 30, 31 respectively are internally threaded at their outer ends and the adjacent ends of the sections of the tubular casing 1 are screwed directly into the spigot and socket members.

In this form of the invention the base of the annular sealing member 14 seats against a shoulder 33 provided by the socket member 31 whilst the inner end wall 32 of the spigot member 30 not only engages a co-operating shoulder provided by the socket member 31 to limit the extent to which the spigot member may be inserted into the socket member, but also engages the sealing member 14 to prevent longitudinal shifting thereof. The spigot and socket members are held together in their assembled position by peening over the end portion 35 of the socket member into engagement with the external shoulder 34 provided by the spigot member. Each of the adjacent ends of the tubular casing is maintained axially aligned with the sliding rod 12 for at least a distance somewhat greater than half the stroke of the rod.

A compound motion transmitting means similar to that shown in Fig. 1 may be employed with the form of the invention shown in Figs. 3 and 4 and may be operatively connected to the sliding rod 12 in the same manner.

I claim:

In remote control apparatus for transmitting tension and compression loads between spaced points located in zones in which different pressures prevail, said zones being separated by a partition having an aperture for passage of said apparatus, the combination with a motion transmitting device comprising a tubular casing, flexible tension transmitting means extending through said casing, separate flexible compression transmitting means extending through said casing, said motion transmitting device being formed in two sections, one section being disposed in each of said zones, and means extending through said partition and connecting said sections to effect transmission of motion therebetween, said last named means comprising a rigid, imperforate rod connected at its opposite ends with the tension transmitting means and the compression transmitting means of the respective sections of said motion transmitting device for transmitting both tension and compression loads therebetween, a member sealed to said partition about said aperture and connected to the adjacent ends of the two sections of the tubular casing, said member having a bore receiving said rod with a sliding fit, and sealing means carried by said member and engaging said rod to prevent leakage of fluid through said partition.

BERNARD ARTHUR PARR.